US008350838B2

(12) United States Patent
Le et al.

(10) Patent No.: US 8,350,838 B2
(45) Date of Patent: Jan. 8, 2013

(54) POWER SUPPLY CIRCUIT FOR LIQUID CRYSTAL DISPLAY

(75) Inventors: Kun Le, Shenzhen (CN); Tong Zhou, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 1061 days.

(21) Appl. No.: 12/316,462

(22) Filed: Dec. 12, 2008

(65) Prior Publication Data

US 2009/0153539 A1 Jun. 18, 2009

(30) Foreign Application Priority Data

Dec. 12, 2007 (CN) .......................... 2007 1 0124991

(51) Int. Cl.
*G09G 5/00* (2006.01)
*G06F 3/038* (2006.01)

(52) U.S. Cl. .......................................... 345/211; 345/87

(58) Field of Classification Search ............ 345/87–104, 345/211–213

See application file for complete search history.

(56) References Cited

U.S. PATENT DOCUMENTS 4,848,876 A * 7/1989 Yamakawa ...................... 345/87
5,583,527 A * 12/1996 Fujisaki et al. ................. 345/55
6,741,239 B2 * 5/2004 Iwasaki ......................... 345/211
7,123,492 B1 10/2006 Ma

FOREIGN PATENT DOCUMENTS

CN 2805264 Y 8/2006
JP 2000172230 A * 6/2000

* cited by examiner

*Primary Examiner* — Stephen Sherman

(74) *Attorney, Agent, or Firm* — WPAT PC; Justin King

(57) ABSTRACT

An exemplary power supply circuit includes an output terminal configured for providing electric power to a load circuit, a direct current (DC) power supply, a first resistor, a second resistor, a first switch and a second switch. The first switch includes a control electrode is grounded via the first resistor, a first current conducting electrode is connected to the DC power supply, and a second current conducting electrode is connected to the output terminal. The second switch includes a control electrode is connected to the output terminal, a first current conducting electrode is connected to the DC power supply, and a second current conducting electrode is connected to the control electrode of the first switch. The second resistor is interconnected the first current conducting electrode of the first switch and the second current conducting electrode of the first switch.

13 Claims, 4 Drawing Sheets

POWER SUPPLY CIRCUIT FOR LIQUID CRYSTAL DISPLAY

The present disclosure relates to a power supply circuit for a liquid crystal display (LCD).

GENERAL BACKGROUND

An LCD has the advantages of portability, low power consumption, and low radiation, and has been widely used in various portable information products such as notebooks, personal digital assistants (PDAs), video cameras and the like. Usually, the liquid crystal display device needs a power supply circuit to provide a working voltage.

Referring to FIG. 6, a typical art power supply circuit 10 for an LCD (not shown) includes a control signal input terminal 11 which is configured for receiving control signals, an output terminal 12 for providing an operation voltage for the LCD, a five volt direct current (DC) power supply 13, a first transistor 14, a second transistor 15, a filter capacitor 16, and a resistor 17.

The first transistor 14 is a p-channel metal-oxide-semiconductor field-effect transistor (MOSFET). A gate electrode 141 of the first transistor 14 is connected to the five volt DC power supply 13 via the resistor 17. A source electrode 142 of the first transistor 14 is connected to the five volt DC power supply 13. A drain electrode 143 of the first transistor 14 is connected to the output terminal 12.

The second transistor 15 is a negative-positive-negative (NPN) bipolar transistor. A base electrode 151 of the second transistor 15 is connected to the control signal input terminal 11. An emitting electrode 152 of the second transistor 15 is connected to the gate electrode 141 of the first transistor 14. A collecting electrode 153 of the second transistor 15 is grounded.

A working principle of the power supply circuit 10 for the LCD is described as follows. When the LCD is connected up a commercial power, the five volt DC power supply 13 provides a five volt voltage to the source electrode 142 of the first transistor 14. When the LCD is powered on, an electric potential of the control signal input terminal 11 is a logic high electric potential. The second transistor 15 is switched on, and the gate electrode 141 of the first transistor 14 is grounded via the collecting electrode 153 and the emitting electrode 152 in turn. Therefore, the first transistor 14 is switched on, a five volt voltage of the five volt DC power supply 13 is provided to the output terminal 12 via the source electrode 142 and the drain electrode 143.

When the LCD is powered off, an electric potential of the control signal input terminal 11 is a logic low electric potential. The second transistor 15 is switched off. The five volt DC power supply 13 provides a voltage to the gate electrode 141 of the first transistor 14 via the resistor 17. Therefore, the first transistor 14 is switched off, and the five volt DC power supply 13 stops providing voltage for the output terminal 12.

When the first transistor 14 is switched on, and the five volt voltage is provided to the output terminal 12 via the activated first transistor 14, a rush current is generated at the moment that the first transistor 14 is switched on. The rush current may accelerate an aging process of electronic devices of the LCD. Thus a service life of the LCD is liable to be reduced.

Further, in case that the LCD is short-circuited, a high short circuit current passes through the first transistor 14. Thus, the first transistor 14 is liable to be destroyed. Thus the reliability of the power supply circuit 10 is low.

It is desired to provide a new power supply circuit used in an LCD which can overcome the above-described deficiencies.

SUMMARY

In one exemplary embodiment, a power supply circuit includes an output terminal configured for proving electric power to a load circuit, a direct current (DC) power supply, a first resistor, a second resistor, a first switch and a second switch. The first switch includes a control electrode is grounded via the first resistor, a first current conducting electrode is connected to the DC power supply, and a second current conducting electrode is connected to the output terminal. The second switch includes a control electrode is connected to the output terminal, a first current conducting electrode is connected to the DC power supply, and a second current conducting electrode is connected to the control electrode of the first switch. The second resistor interconnects the first current conducting electrode of the first switch and the second current conducting electrode of the first switch.

Other novel features and advantages will become more apparent from the following detailed description when taken in conjunction with the accompanying drawings.

DETAILED DESCRIPTION OF EMBODIMENTS

Reference will now be made to the drawings to describe preferred and exemplary embodiments of the present disclosure in detail.

Figure 1:
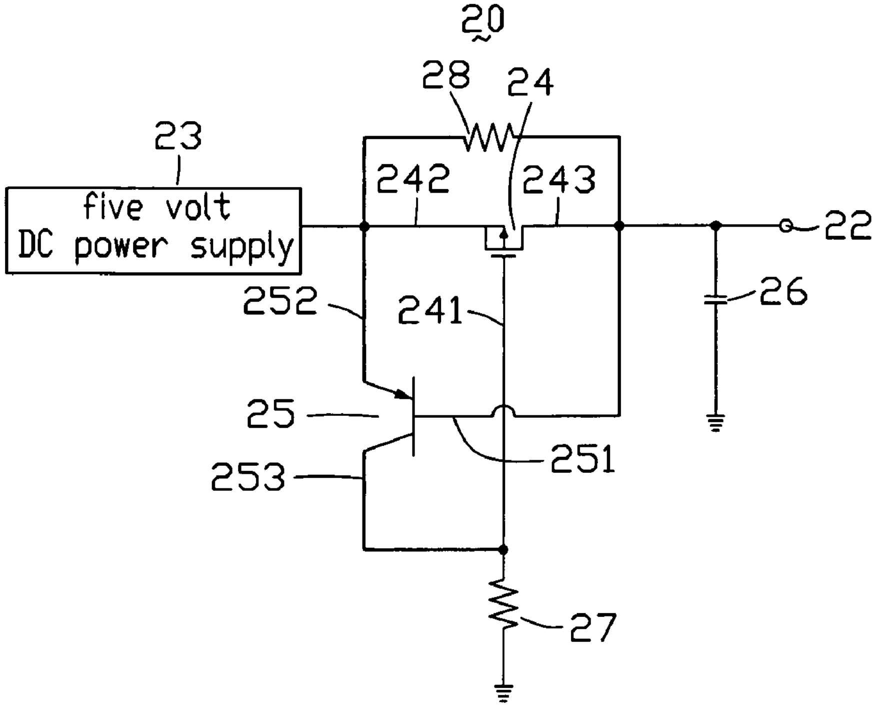
FIG. 1 is a circuit diagram of a power supply circuit according to a first embodiment of the present disclosure, the power supply circuit being typically used in an LCD.

Referring to FIG. 1, this is a current diagram of a power supply circuit according to a first embodiment of the present invention, and the power supply circuit 20 is generally used in an LCD (not shown). The power supply circuit 20 includes a five volt DC power supply 23, a first transistor 24, a second transistor 25, a filter capacitor 26, a first resistor 27, a second resistor 28, and an output terminal 22 configured for providing electric power to a load circuit (non shown) such as an LCD.

The first transistor 24 is a p-channel MOSFET. A gate electrode 241 of the first transistor 24 is grounded via the first resistor 27. A source electrode 242 of the first transistor 24 is connected to the five volt DC power supply 23. A drain electrode 243 of the first transistor 24 is connected to the output terminal 22, and is grounded via the filter capacitor 26. The second resistor 28 is interconnects the source electrode 242 and the drain electrode 243. The second resistor 28 can, for example, be a protective tube.

The second transistor 25 is a positive-negative-positive (PNP) bipolar transistor. A base electrode 251 of the second transistor 25 is connected to the output terminal 22. An emitting electrode 252 of the second transistor 25 is connected to the five volt DC power supply 23. A collecting electrode 253 of the second transistor 25 is connected to the gate electrode 241 of the first transistor 24.

A working principle of the power supply circuit 20 for the LCD is described as follows. When the LCD is connected up a commercial power, the five volt DC power supply 23 provides a five volt voltage to the source electrode 242 of the first transistor 24 and the emitting electrode 252 of the second transistor 25. Thus, a voltage difference between the emitting electrode 252 and the base electrode 251 is higher than threshold voltage of the second transistor 25. Thus the second transistor 25 is switched on, and the gate electrode 241 of the first transistor 24 is connected to the five volt DC power supply 23 via the collecting electrode 253 and the emitting electrode 252 in turn. Thus the first transistor 24 is switched off, and the filter capacitor 26 is charged by the five volt DC power supply 23 via the second resistor 28.

Along with the increase of charging time for the filter capacitor 26, a voltage of the output terminal 22 is increased gradually. Thus, a voltage difference between the emitting electrode 252 and the base electrode 251 is lower than the threshold voltage of the second transistor 25. Thus, the second transistor 25 is switched off, and the first transistor 24 is switched on. The five volt DC power supply 23 provides a voltage to the output terminal 22 via the source electrode 242 and the drain electrode in turn.

When an internal circuit (not shown) of the LCD is short-circuited, the second transistor 25 is switched on.

Because the filter capacitor 26 is charged by the five volt DC power supply 23 before the first transistor 24 is switched on, the voltage of the output terminal 22 is increased, and a voltage difference between the source electrode 242 and the drain electrode 243 of the first transistor 24 is decreased. Therefore, a rush current passed through the first transistor 24 is reduced at the moment that the first transistor 24 is switched on.

Furthermore, when an internal circuit of the LCD is short-circuited, the second transistor 25 is switched on. Thus, the first transistor 24 is switched off, and is protected from being destroyed. Therefore the reliability of the power supply circuit 20 is high.

Figure 2:
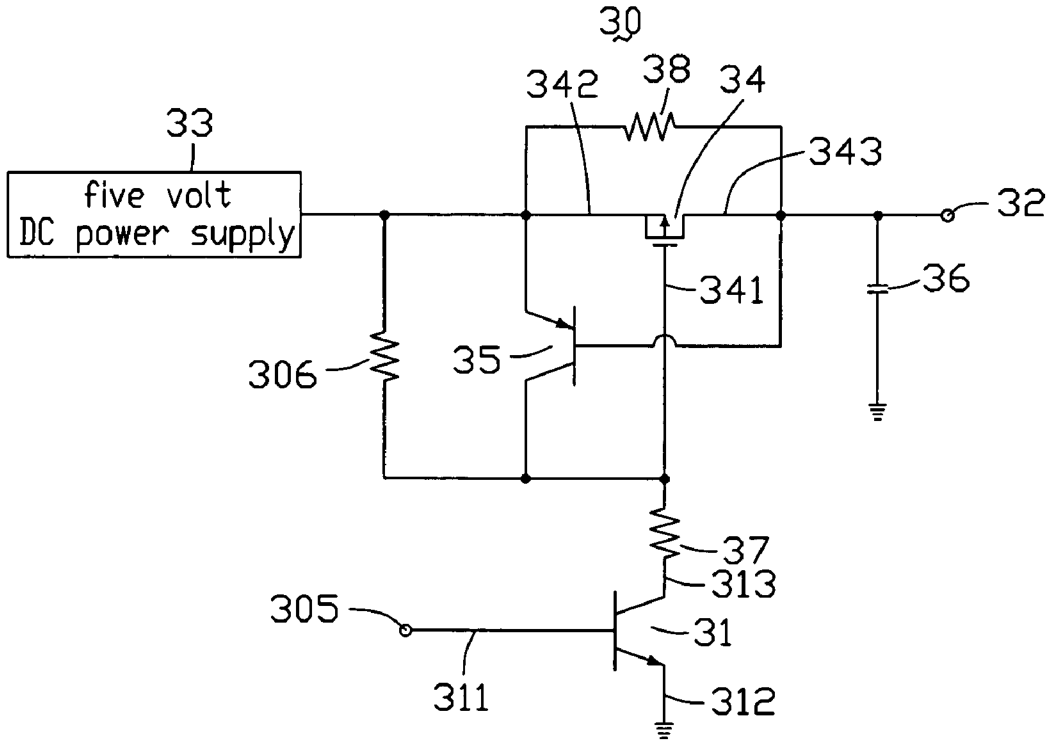
FIG. 2 is a circuit diagram of a power supply circuit according to a second embodiment of the present disclosure.

Referring to FIG. 2, this is a current diagram of a power supply circuit 30 according to a second embodiment of the present invention. The power supply circuit 30 is similar to the power supply circuit 20 expect that the power supply circuit 30 further includes a third transistor 31, a control signal input terminal 305 configured for receiving a control signal, and a third resistor 306.

The third transistor 31 is an NPN bipolar transistor. A base electrode 311 of the third transistor 31 is connected to the control signal input terminal 305. An emitting electrode 312 of the third transistor 31 is grounded. A collecting electrode 313 of the third transistor 31 is connected to a gate electrode 341 of the first transistor 34 via a first transistor 37, and is connected to a five volt DC power supply 33 via the first resistor 37 and the third resistor 306 in turn.

When the LCD is powered on, an electric potential of the control signal input terminal 305 is a logic high electric potential. Thus, the third transistor 31 is switched on, and the gate electrode 341 of the first transistor 34 is grounded via the first resistor 37, the collecting electrode 313 and the emitting electrode 312 of the third transistor 31 in turn. Thus, the first transistor is switched on, the second transistor is switched off, and the five volt DC power supply 33 is provided to an output terminal 32 via the source electrode 342 and the drain electrode 343 of the first transistor 34.

When the LCD is powered off, an electric potential of the control signal input terminal 305 is a logic low electric potential. Thus, the third transistor 31 is switched off. The five volt DC power supply 33 provides a voltage to the gate electrode 341 of the first transistor 34 via the third resistor 306. Thus, the first transistor 34 is switched off, and the five volt DC power supply 33 stops providing voltage for the output terminal 32.

When an internal circuit of the LCD is short-circuited, the second transistor 35 is switched on. Thus, the first transistor 34 is switched off, and is protected from being destroyed.

Figure 3:
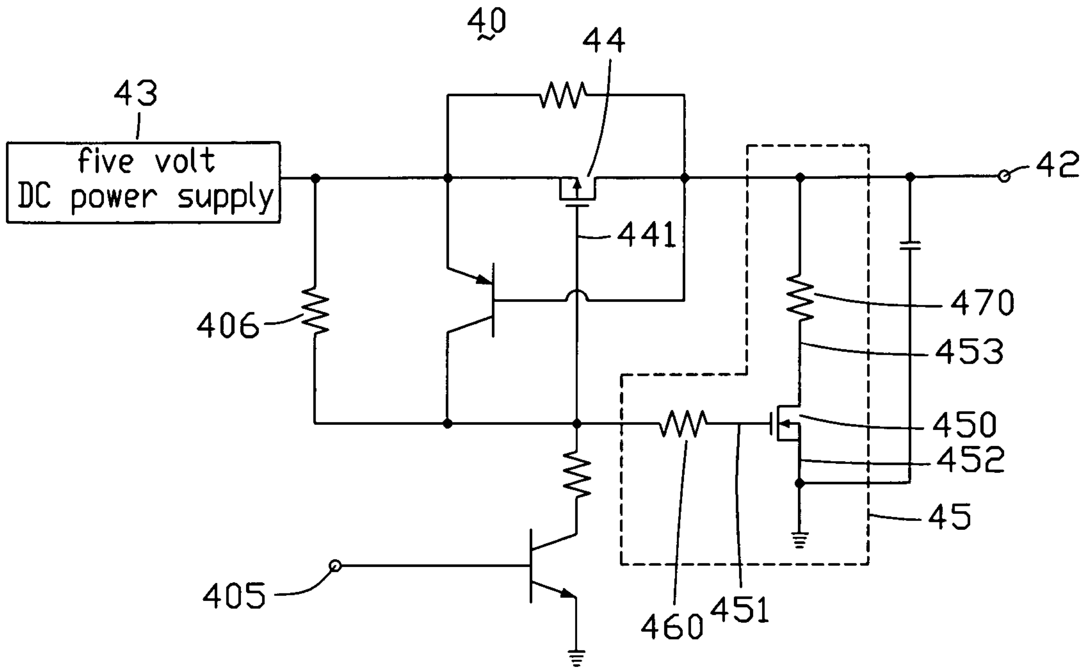
FIG. 3 is a circuit diagram of a power supply circuit according to a third embodiment of the present disclosure.

Referring to FIG. 3, this is a current diagram of a power supply circuit according to a third embodiment of the present invention. The power supply circuit 40 is similar to the power supply circuit 30 except that the power supply circuit 40 further includes a discharge circuit 45. The discharge circuit 45 is configured to remove residual voltage as soon as the LCD is powered off. The discharge circuit 45 includes a fourth transistor 450, a fourth resistor 460 and a fifth resistor 470. The fourth resistor 450 is an n-channel MOSFET. A gate electrode 451 of the fourth transistor 450 is connected to a gate electrode 441 of a first transistor 44 via the fourth resistor 460. A source electrode 452 of the fourth transistor 450 is grounded. A drain electrode 453 of the fourth transistor 450 is connected to an output terminal 42 via the fifth resistor 470.

A working principle of the power supply circuit 40 for the LCD is described as follows. When the LCD is powered off, an electrical potential of a control signal input terminal 405 is a logic low electric potential. Thus, a third transistor is switched off. The five volt DC power supply 43 is connected to a gate electrode 441 of a first transistor 44 via a third resistor 406, and is connected to a gate electrode 451 of a fourth transistor 450 via the third resistor 406 and the fourth resistor 460 in turn. Thus, the first transistor 44 is switched off, and the fourth transistor 450 is switched on. The five volt DC power supply 43 is stops providing a voltage to the output terminal 42. At the same time, residual voltage of the LCD is quickly discharged through the fifth resistor 470.

Figure 4:
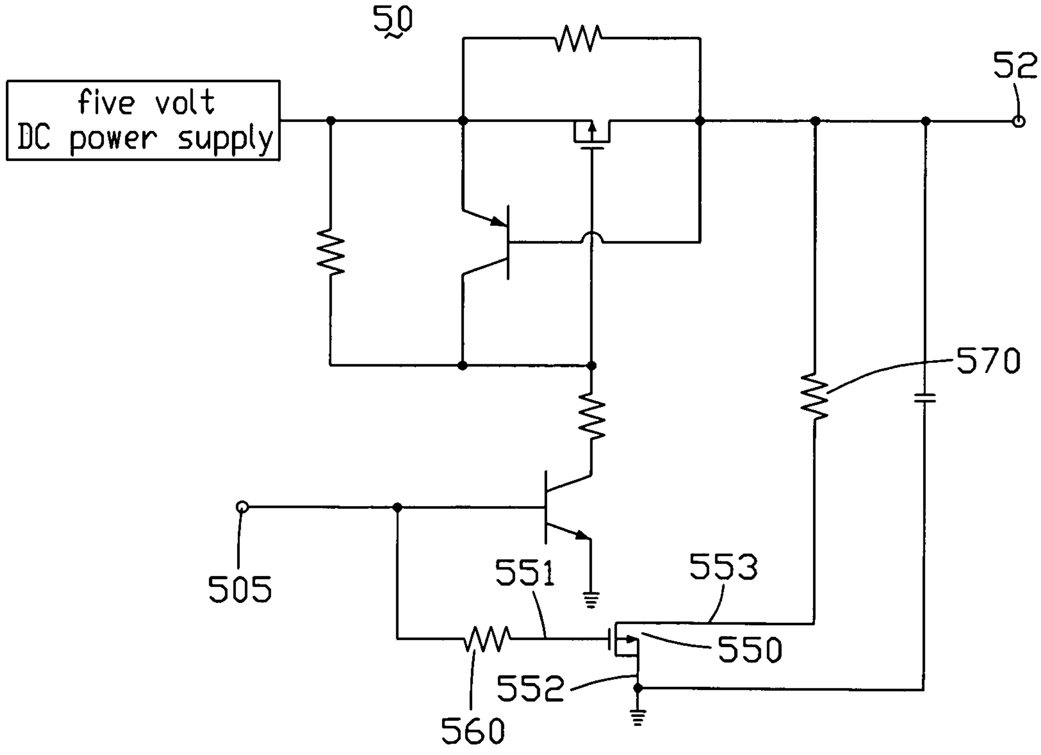
FIG. 4 is a circuit diagram of a power supply circuit according to a fourth embodiment of the present disclosure.

Referring to FIG. 4, this is a current diagram of a power supply circuit 50 according to a fourth embodiment of the present invention. The power supply circuit 50 is similar to the power supply circuit 40 except that a fourth transistor 550 of the power supply circuit 50 is a p-channel MOSFET. A gate electrode 551 of the fourth transistor 550 is connected to a control signal input terminal 505 via a fourth resistor 560. A source electrode 552 is grounded. A drain electrode 553 is connected to an output terminal 52 via a fifth resistor 570.

Figure 5:
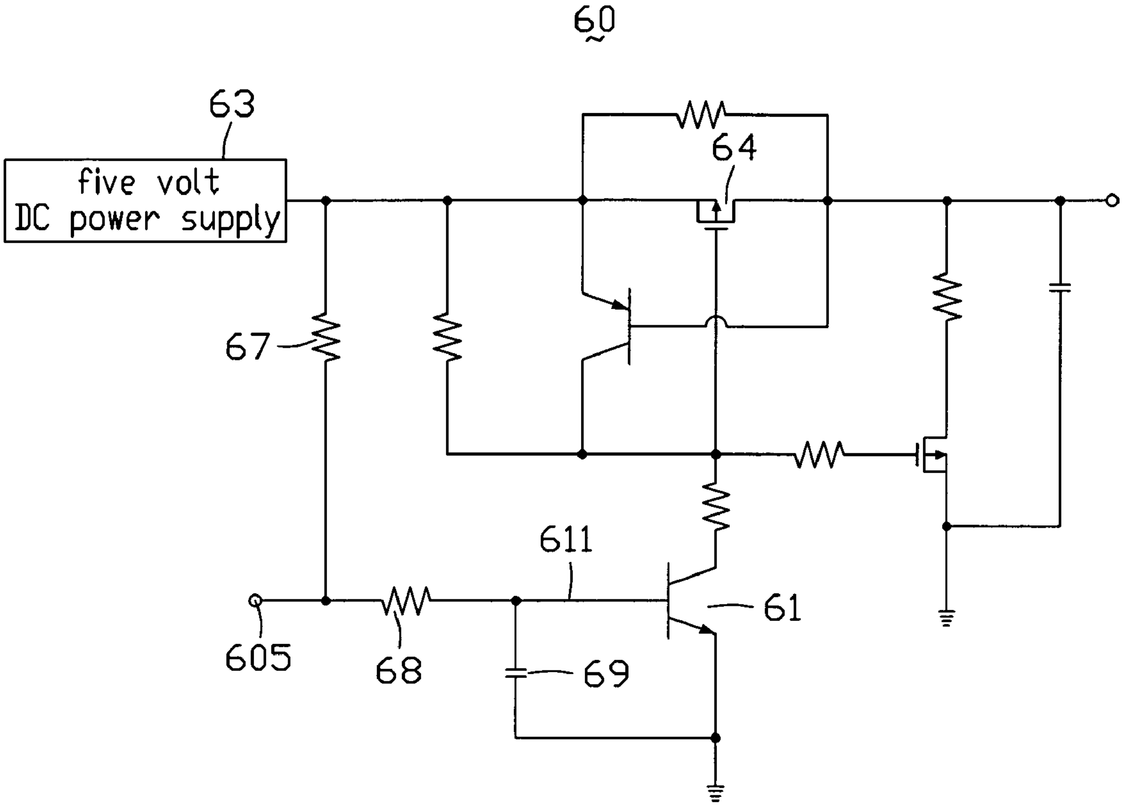
FIG. 5 is a circuit diagram of a power supply circuit according to a fifth embodiment of the present disclosure.
Figure 6:
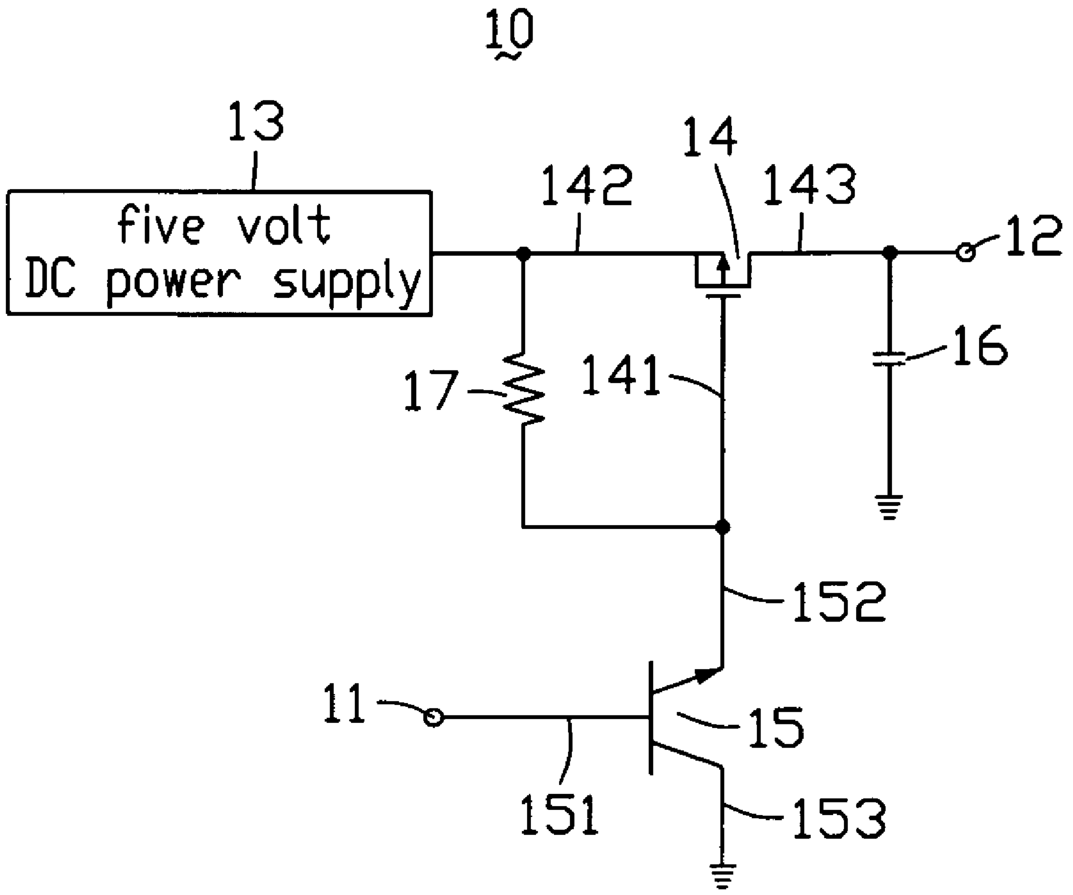
FIG. 6 (RELATED ART)
FIG. 6 is a circuit diagram of a conventional power supply circuit used in an LCD.

Referring to FIG. 5, this is a current diagram of a power supply circuit 60 according to a fifth embodiment of the present invention. The power supply circuit 60 is similar to the power supply circuit 50 except that the power supply circuit 60 further includes a sixth resistor 67, a seventh resistor 68 and a protective capacitor 69. The sixth resistor 67 interconnects a five volt power supply 63 and a control signal input terminal 605. The seventh resistor 68 interconnects the control signal input terminal 605 and a base electrode 611 of a third transistor 61. One terminal of the protective capacitor 69 is grounded, and the other is connected to the base electrode 611 of the third transistor 61. A RC delay circuit is made up of the protective capacitor 69 and the seventh resistor 68. The sixth resistor 67 and the RC delay circuit are configured for further decreasing a rush current which is generated at the moment that the first transistor 64 is switched on.

In the above-described first embodiment, the five volt DC power supply of the first embodiment to the fifth embodiment can be changed according to a requirement. For example, the DC power supply of the power supply circuits of the first embodiment to the fifth embodiment provides a twelve volt DC voltage in case that the output terminals need higher voltages.

The first transistor 24 of the first embodiment can be a PNP bipolar transistor. A control electrode of the first transistor 24 is grounded via a first resistor. A first current conducting electrode of the first transistor 24 is connected to a five volt DC power supply. A second current conducting electrode of the first transistor 24 is connected to an output terminal, and is grounded via a filter capacitor.

The second transistor 25 of the first embodiment can be a p-channel MOSFET. A control electrode of the second transistor 25 is connected to an output terminal. A first current conducting electrode of the second transistor 25 is connected to a five volt DC power supply. A second current conducting electrode of the second transistor 25 is connected to a gate electrode of a first transistor.

The third transistor 31 of the second embodiment can be an n-channel MOSFET. A control electrode of the third transistor 31 is connected to a control signal input terminal. A first current conducting electrode of the third transistor 31 is grounded. A second current conducting electrode of the third transistor 31 is connected to a gate electrode of a first transistor via a first resistor, and is connected to a five volt DC power supply via the first resistor and a third resistor in turn.

The fourth transistor 450 of the third embodiment can be an NPN bipolar transistor. A control electrode of the fourth transistor 450 is connected to a gate electrode of a first transistor via a fourth resistor. A first current conducting electrode of the fourth transistor 450 is grounded. A second current conducting electrode of the fourth transistor 450 is connected, to an output terminal via a fifth resistor.

The power supply circuit of the fourth embodiment further includes a sixth resistor, a seventh resistor and a protective capacitor. The sixth resistor interconnects the five volt DC power supply and the control signal input terminal 505. The seventh resistor interconnects the control signal input terminal 505 and a base electrode of a third transistor. One terminal of the protective capacitor is grounded, and the other terminal is connected to the base electrode of the third transistor.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of arrangement of parts) within the principles of the disclosure to the full extent indicated by the broad general meaning of the terms in which the appended claims are expressed.

What is claimed is:

1. A power supply circuit, comprising:
- an output terminal configured for providing electric power to a load circuit;
- a direct current (DC) power supply;
- a first resistor;
- a first switch comprising a first switch control electrode grounded via the first resistor, a first switch first current conducting electrode connected to the DC power supply, and a first switch second current conducting electrode connected to the output terminal;
- a second switch comprising a second switch control electrode connected to the output terminal, a second switch first current conducting electrode connected to the DC power supply, and a second switch second current conducting electrode connected to the control electrode of the first switch;
- a second resistor interconnected the first switch first current conducting electrode and the first switch second current conducting electrode;
- a control signal input terminal configured for receiving control signals;
- a third resistor;
- a third switch comprising a third switch control electrode connected to the control signal input terminal, a third switch first current conducting electrode being grounded, a third switch second current conducting electrode connected to the first switch control electrode via the first resistor, and connected to the DC power supply via the first resistor and the third resistor in turn;
- a discharge circuit comprising:
  - a fourth resistor;
  - a fifth resistor; and
  - a fourth switch comprising a fourth switch control electrode connected to the first switch control electrode via the fourth resistor, a fourth switch first current conducting electrode being grounded, and a fourth switch second current conducting electrode connected to the power supply via the fifth resistor;
- a sixth resistor interconnected the power supply and the control signal input terminal;
- a seventh resistor, interconnected the control signal input terminal and the third switch control electrode; and
- a protective capacitor comprising a protective capacitor first terminal being grounded, and a protective capacitor second terminal connected to the third switch control electrode.

2. The power supply circuit of claim 1, wherein the DC power supply provides a five volt voltage or a twelve volt voltage.

3. The power supply circuit of claim 1, wherein the load circuit is a liquid crystal display.

4. The power supply circuit of claim 1, wherein the first switch is a p-channel metal-oxide-semiconductor field-effect transistor (MOSFET), a gate electrode of the p-channel MOSFET being the first switch control electrode, a source electrode of the p-channel MOSFET being the first switch first current conducting electrode, and a drain electrode of the p-channel MOSFET being the first switch second current conducting electrode.

5. The power supply circuit of claim 4, wherein the second switch is a positive-negative-positive (PNP) transistor, a base electrode of the PNP transistor being the second switch control electrode, an emitting electrode of the PNP transistor being the second switch first current conducting electrode, and a collecting electrode of the PNP transistor being the second switch second current conducting electrode.

6. The power supply circuit of claim 1, further comprising a filter capacitor, wherein one terminal of the filter capacitor is grounded, and the other terminal is connected to the output terminal.

7. The power supply circuit of claim 1, wherein the second resistor is a protective tube.

8. The power supply circuit of claim 1, wherein the third switch is a negative-positive-negative (NPN) transistor, a base electrode of the NPN transistor being the third switch control electrode, an emitting electrode of the NPN transistor being the third switch first current conducting electrode, and a collecting electrode of the NPN transistor being the third switch second current conducting electrode.

9. The power supply circuit of claim 1, wherein the fourth switch is an n-channel MOSFET, a gate electrode of the n-channel MOSFET being the fourth switch control electrode, a source electrode of the n-channel MOSFET being the fourth switch first current conducting electrode, and a drain electrode of the n-channel MOSFET being the fourth switch second current conducting electrode.

10. A power supply circuit, comprising:

an output terminal configured for providing electric power to a load circuit;

a first resistor with a first terminal and a second terminal;

a first switch with a first switch first current conducting electrode and a first switch second current conducting electrode;

a second switch;

a direct current (DC) power supply connected to the power supply via the first switch, and grounded via the second switch, the first terminal and the second terminal of the first resistor in turn;

a second resistor interconnected the first switch first current conducting electrode and the first switch second current conducting electrode;

a third switch comprising a control signal input terminal configured for receiving control signals;

a third resistor;

a third switch comprising a third switch control electrode connected to the control signal input terminal, a third switch first current conducting electrode being grounded, a third switch second current conducting electrode connected to the first switch control electrode via the first resistor, and connected to the DC power supply via the first resistor and the third resistor in turn;

a discharge circuit, comprising:

a fourth resistor;

a fifth resistor; and a fourth switch, comprising a fourth switch control electrode connected to the control signal input terminal via the fourth resistor, a fourth switch first current conducting electrode being grounded, and a fourth switch second current conducting electrode connected to the power supply via the fifth resistor;

a sixth resistor interconnected the power supply and the control signal input terminal;

a seventh resistor interconnected the control signal input terminal and the control electrode of the third switch; and a protective capacitor comprising a protective capacitor first terminal being grounded, and a protective capacitor second terminal connected to the third switch control electrode;

wherein, a voltage of the first terminal of the first resistor is configured for controlling a on-off state of the first switch, and a voltage of the output terminal is configured for controlling a on-off state of the second switch.

11. The power supply circuit of claim 10, wherein the DC power supply provides a five volt voltage or a twelve volt voltage.

12. The power supply circuit of claim 10, wherein the load circuit is a liquid crystal display.

13. The power supply circuit of claim 10, wherein the fourth switch is an p-channel MOSFET, a gate electrode of the p-channel MOSFET being the control electrode of the fourth switch, a source electrode of the p-channel MOSFET being the first current conducting electrode of the fourth switch, and a drain electrode of the p-channel MOSFET being the second current conducting electrode of the fourth switch.

* * * * *